US007862465B2

(12) United States Patent  
Nishida et al.

(10) Patent No.: US 7,862,465 B2
(45) Date of Patent: Jan. 4, 2011

(54) AUTOMATIC TRANSMISSION

(75) Inventors: Masaaki Nishida, Anjo (JP); Hiroshi Katou, Anjo (JP); Masashi Kitou, Anjo (JP); Kohei Iizuka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 545 days.

(21) Appl. No.: 12/071,568

(22) Filed: Feb. 22, 2008

(65) Prior Publication Data

US 2008/0202884 A1 Aug. 28, 2008

(30) Foreign Application Priority Data

| Feb. 23, 2007 | (JP) | ............................. 2007-043279 |
| Jul. 5, 2007 | (JP) | ............................. 2007-177824 |
| Jul. 5, 2007 | (JP) | ............................. 2007-177825 |
| Jul. 5, 2007 | (JP) | ............................. 2007-177826 |
| Jul. 5, 2007 | (JP) | ............................. 2007-177827 |
| Jul. 24, 2007 | (JP) | ............................. 2007-192689 |

(51) Int. Cl.
 *F16H 3/62* (2006.01)
(52) U.S. Cl. .................................................. 475/275
(58) Field of Classification Search ......... 475/275–278, 475/284, 296
 See application file for complete search history.

(56) References Cited

U.S. PATENT DOCUMENTS 6,454,074 B1 * 9/2002 Kundermann et al. .. 192/48.618

| 7,416,069 | B2 * | 8/2008 | Tiesler ................... 192/48.611 |
| 2007/0060438 | A1 | 3/2007 | Fukuyama et al. |
| 2007/0184932 | A1 | 8/2007 | Tabata et al. |
| 2008/0207386 | A1 * | 8/2008 | Nishida et al. .............. 475/276 |
| 2008/0220928 | A1 * | 9/2008 | Nishida et al. .............. 475/275 |
| 2009/0017954 | A1 * | 1/2009 | Nishida et al. .............. 475/159 |
| 2009/0029820 | A1 * | 1/2009 | Nishida et al. .............. 475/159 |

FOREIGN PATENT DOCUMENTS

| JP | A 1-210624 | 8/1989 |
| JP | A-07-269665 | 10/1995 |
| JP | U 3121527 | 4/2006 |
| JP | A-2006-342845 | 12/2006 |
| JP | A-2007-032624 | 2/2007 |
| WO | WO 2005/026579 A1 | 3/2005 |

* cited by examiner

*Primary Examiner*—Ha D. Ho
(74) *Attorney, Agent, or Firm*—Oliff & Berridge, PLC

(57) ABSTRACT

An automatic transmission that includes two clutches that are provided in mutually different positions in a radial direction while overlapping each other in an axial direction. The two clutches each include a clutch drum; a piston that structures a operating oil chamber while using a part of the clutch drum as a cylinder; a plurality of friction plates that engage the clutch drum; and a cancel oil chamber that is disposed on a back face side of the piston and that cancels a centrifugal hydraulic pressure acting on the operating oil chamber.

11 Claims, 5 Drawing Sheets

F I G . 1
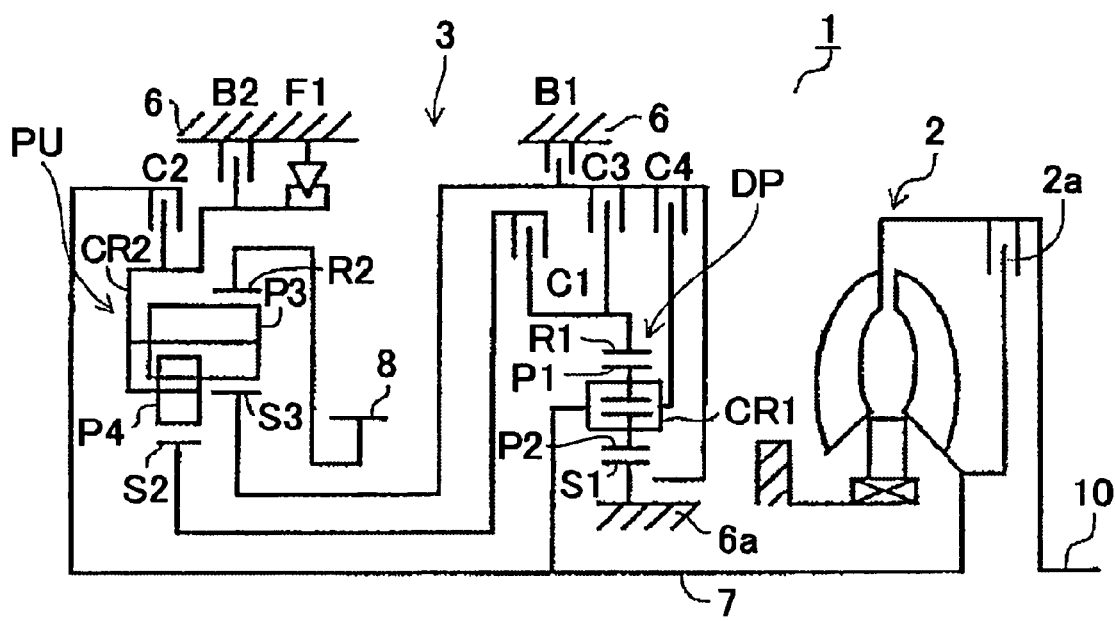
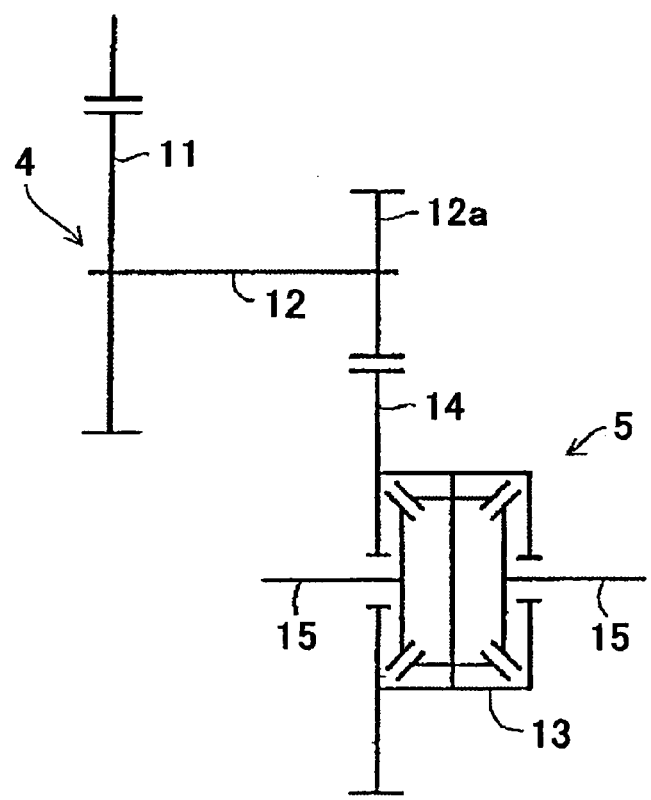

FIG.2

|      | C1 | C2 | C3 | C4 | B1 | B2  | F1 |
|------|----|----|----|----|----|-----|----|
| 1st  | ●  |    |    |    |    | (●) | ●  |
| 2nd  | ●  |    |    |    | ●  |     |    |
| 3rd  | ●  |    | ●  |    |    |     |    |
| 4th  | ●  |    |    | ●  |    |     |    |
| 5th  | ●  | ●  |    |    |    |     |    |
| 6th  |    | ●  |    | ●  |    |     |    |
| 7th  |    | ●  | ●  |    |    |     |    |
| 8th  |    | ●  |    |    | ●  |     |    |
| Rev1 |    |    | ●  |    |    | ●   |    |
| Rev2 |    |    |    | ●  |    | ●   |    |

(●) DENOTES BEING CARRIED OUT DURING ENGINE BRAKING

AUTOMATIC TRANSMISSION

INCORPORATION BY REFERENCE

The disclosure of Japanese Patent Application No. 2007-192689 filed on Jul. 24, 2007, Japanese Patent Application No. 2007-043279 filed on Feb. 23, 2007, Japanese Patent Application No. 2007-177825 filed on Jul. 5, 2007, Japanese Patent Application No. 2007-177826 filed on Jul. 5, 2007, Japanese Patent Application No. 2007-177827 filed on Jul. 5, 2007, and Japanese Patent Application No. 2007-177824 filed on Jul. 5, 2007 including the specifications, drawings and abstracts are incorporated herein by reference in their entirety.

BACKGROUND

The present invention generally relates to an automatic transmission.

Recently, many automatic transmissions installed in vehicles are multi-speed automatic transmissions that have, for example, eight forward speeds. In addition, from the standpoint of convenience in assembling transmissions into vehicles, there has been a demand that many of the component parts, such as clutches, should be arranged in a compact manner in each automatic transmission.

There exists an automatic transmission in which two clutches are provided in mutually different positions in the radial direction while overlapping each other in the axial direction, so as to make the automatic transmission compact, especially in the axial direction. In this automatic transmission, in the two clutches, either the input or output member is provided as a common member, and the other is provided as a separate member (see, for example, Japanese Patent Application Publication No. JP-A-H7-269665). In each of the two clutches, a large number of friction plates, an operating oil chamber that operates the friction plates, and a cancel oil chamber that cancels the centrifugal hydraulic pressure in the operating oil chamber are disposed so as to overlap one another in the axial direction.

Each of the two operating oil chambers and each of the two cancel oil chambers are provided in the corresponding one of the clutch drums, each of which is integrally structured with a turbine shaft. A hydraulic pressure is supplied to each of the two operating oil chambers via an oil hole formed in the corresponding one of the clutch drums. In particular, to the operating oil chamber that is positioned on the radially outer side, the hydraulic pressure is supplied via an oil passage that is independently formed on the outside of the clutch drum positioned on the radially inner side and an oil passage that is formed in the clutch drum positioned on the radially inner side.

Of the two cancel oil chambers, to the cancel oil chamber positioned on the radially inner side, oil is directly supplied via an oil hole formed in a boss portion of the clutch drum. To the cancel oil chamber positioned on the radially outer side, the oil stored in the cancel oil chamber that is positioned on the radially inner side is supplied via an oil passage provided in a piston of the clutch positioned on the radially inner side and via an oil passage provided in the clutch drum that is positioned on the radially inner side.

SUMMARY

The two clutches are provided in the mutually different positions in the radial direction while overlapping each other in the axial direction. Thus, it is possible to make the dimension in the axial direction smaller. However, the structures of the oil passages used for supplying the hydraulic pressure (or the oil) to the operating oil chambers and the cancel oil chambers are complicated.

In particular, in order to supply the hydraulic pressure to the operating oil chamber positioned on the radially outer side, it is necessary to configure the clutch drum positioned on the radially inner side as a fixing member, to provide the independent oil passage on the outside thereof, and to supply the hydraulic pressure via the oil passage provided in the clutch drum positioned on the radially inner side. Thus, the structures of the oil passages are complicated.

In view of this situation, the present invention provides an automatic transmission that is able to solve the problem described above by being compact, especially in the axial direction, and having simple oil passage structures. The present invention is also able to achieve other advantages.

According to an exemplary aspect of the invention, an automatic transmission includes two clutches that are provided in mutually different positions in a radial direction while overlapping each other in an axial direction. The two clutches each include a clutch drum; a piston that structures an operating oil chamber while using a part of the clutch drum as a cylinder; a plurality of friction plates that engage the clutch drum; and a cancel oil chamber that is disposed on a back face side of the piston and that cancels a centrifugal hydraulic pressure acting on the operating oil chamber. The operating oil chamber and the cancel oil chamber of one clutch of the two clutches positioned on a radially outer side are respectively positioned on a radially outer side of the operating oil chamber and the cancel oil chamber of the other clutch of the two clutches positioned on a radially inner side. The clutch drum of the one clutch of the two clutches includes an inner circumference side member and an outer circumference side member that are integrally structured, the inner circumference side member including a boss portion and a piston supporting portion, and the outer circumference side member including a drum portion and a bottom portion. An oil passage through which a hydraulic pressure is supplied and discharged to and from the operating oil chamber of the one clutch of the two clutches is formed between the inner circumference side member and the outer circumference side member.

BRIEF DESCRIPTION OF THE DRAWINGS

Various exemplary aspects of the invention will be described with reference to the drawings, wherein:

FIG. 1 is a skeleton diagram that schematically shows an automatic transmission according to the present invention;

FIG. 2 is a table showing engagements in the automatic transmission according to the present invention;

DETAILED DESCRIPTION OF EMBODIMENTS

Embodiments of the present invention will be explained with reference to FIGS. 1 to 5.

Figure 3:
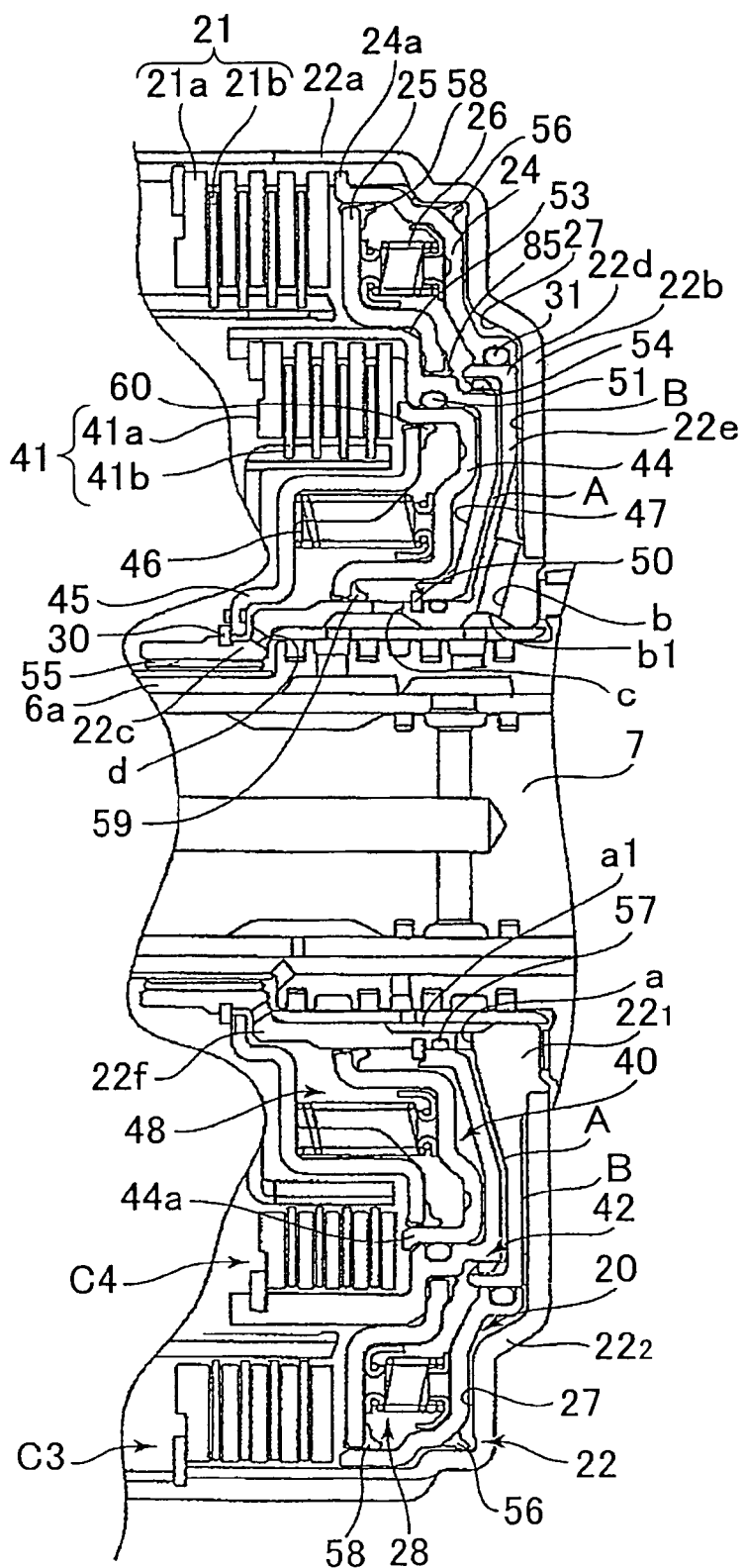
FIG. 3 is an enlarged cross-sectional view of a part of an automatic transmission according to a first embodiment of the present invention.
Figure 4:
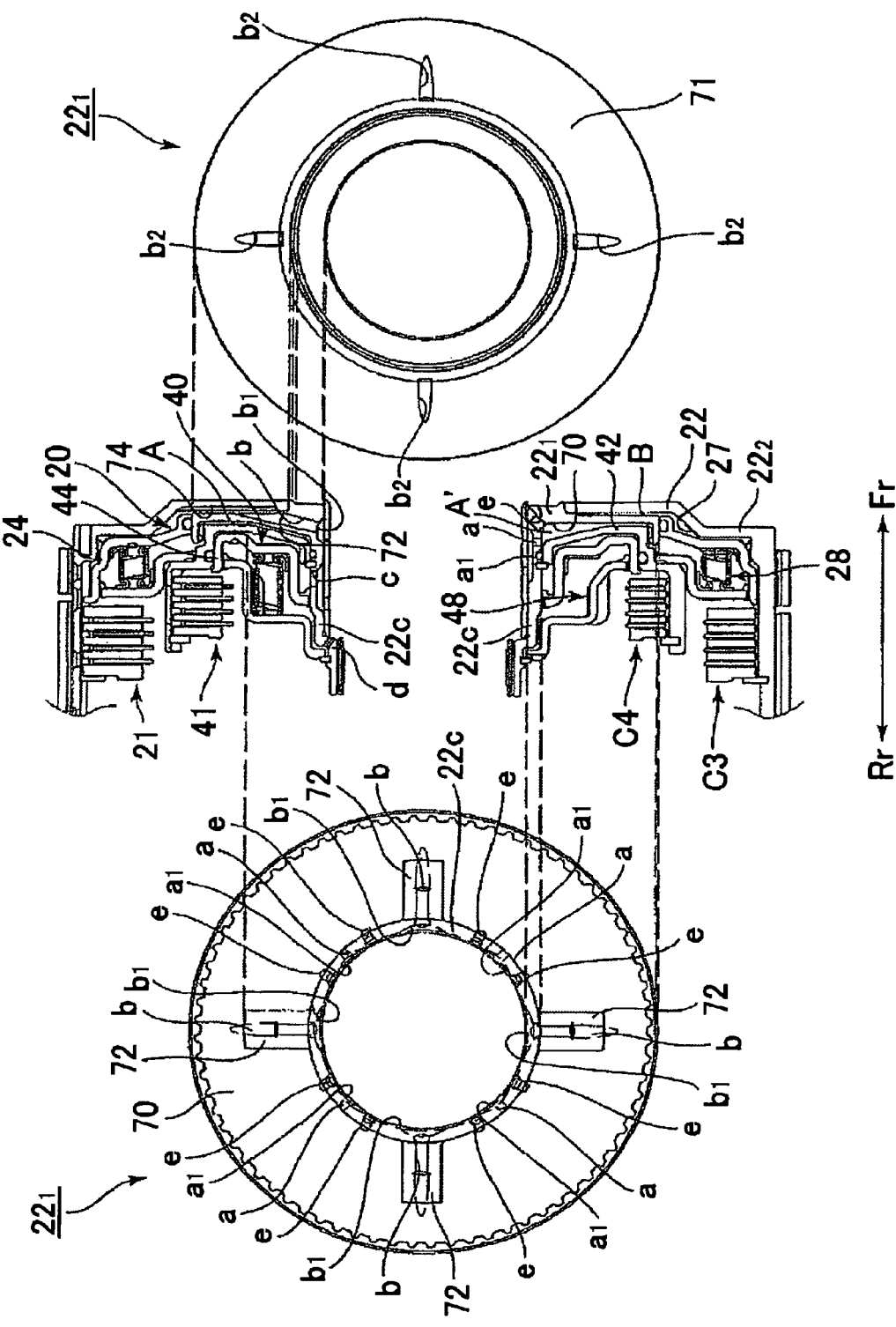
FIG. 4A is a plan view of an inner drum according to a second embodiment of the present invention, viewed from the Rr direction.
FIG. 4B is an enlarged cross-sectional view of a part of the automatic transmission according to the second embodiment.
FIG. 4C is a plan view of the inner drum according to the second embodiment, viewed from the Fr direction.
Figure 5:
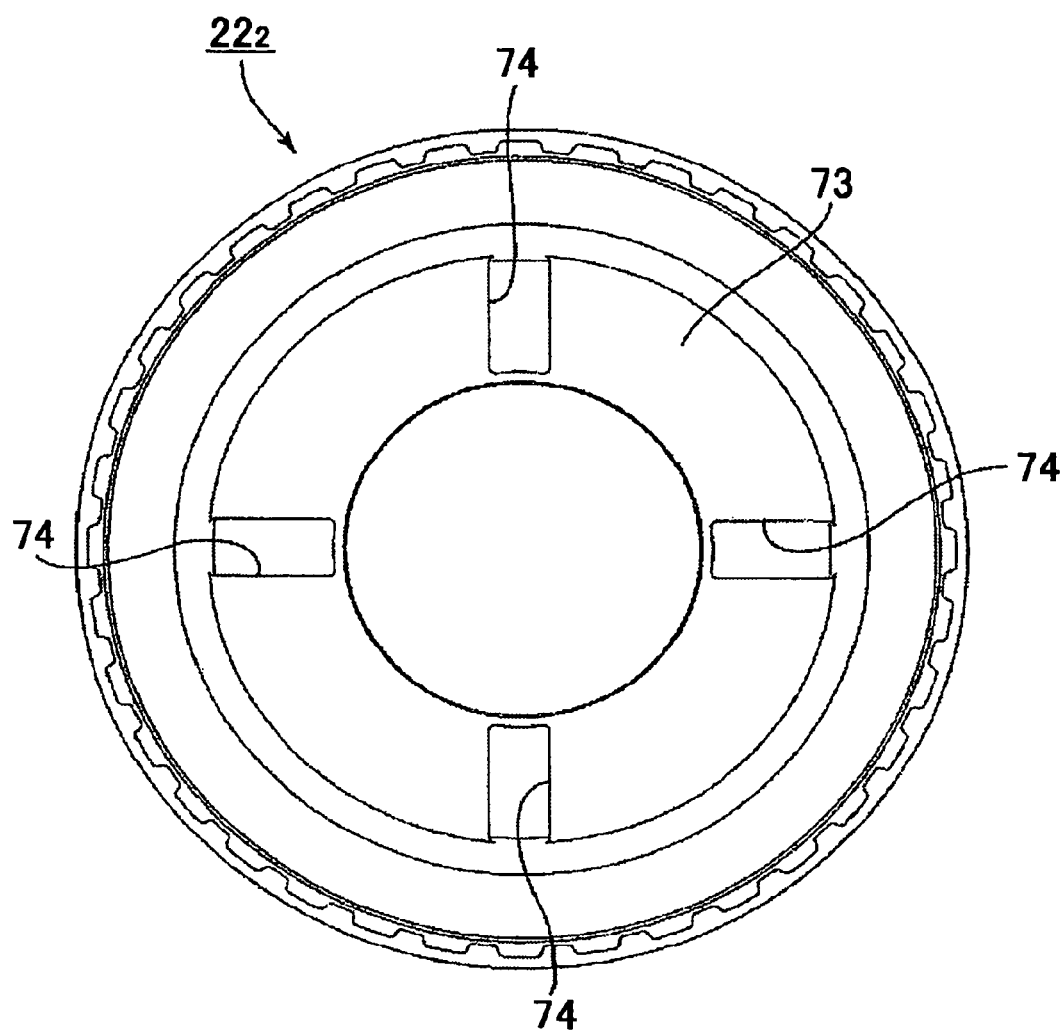
FIG. 5 is a plan view of an outer drum according to the second embodiment, viewed from the Rr direction.

An automatic transmission according to the present invention is suitable for being assembled into, for example, an FF (front-engine front-drive) type vehicle. In FIGS. 1, 3, and 4, the right/left direction corresponds to the front/rear direction of a power transmission path (a driving power source side and a wheel side are referred to as a front side and a rear side, respectively). For the convenience of explanation, the right hand side in the drawings on which a driving power source like an engine is positioned will be referred to as the "front side," whereas the left hand side in the drawings will be referred to as the "rear side."

First, a schematic structure of an automatic transmission 1 to which the present invention is applicable will be explained with reference to FIG. 1. As shown in FIG. 1, the automatic transmission 1 for an FF type vehicle includes a case 6 such as a housing case and a transmission case. The front side of the case (specifically, the converter housing) 6 has an input member (i.e., a front cover and a center piece) 10 by which the automatic transmission 1 that can be connected to an engine, which is not shown in the drawing. Also, in the automatic transmission 1, a torque converter 2 that includes a lock-up clutch 2a is provided. In addition, a speed change mechanism 3, a countershaft unit 4, and a differential unit 5 are provided within the case 6.

The torque converter 2 is positioned on an axis centered on an input shaft 7 of the speed change mechanism 3 that is coaxially provided with an output shaft of the engine (not shown in the drawing). Also, a countershaft unit 4 is positioned around a countershaft 12 that is provided on an axis parallel to the input shaft 7. The differential unit 5 is positioned so as to have left and right wheel shafts 15, 15 on an axis that is parallel to the countershaft 12.

The speed change mechanism 3 includes a planetary gear (i.e., a decelerating planetary gear) DP that is provided around the input shaft 7. A planetary gear unit (i.e., a planetary gear set) PU is provided on the rear side of the planetary gear DP.

The planetary gear DP includes a first sun gear S1, a first carrier CR1, and a first ring gear R1. The planetary gear DP is a so-called double pinion planetary gear in which the first carrier CR1 includes a pinion P2 meshing with the first sun gear S1 and a pinion P1 meshing with the first ring gear R1 in such a manner that the pinion P2 meshes with the pinion P1.

The planetary gear unit PU includes four rotating elements such as a second sun gear S2, a third sun gear S3, a second carrier CR2, and a second ring gear R2. The planetary gear unit PU is a Ravigneaux type planetary gear in which the second carrier CR2 includes a long pinion P3 meshing with the third sun gear S3 and the second ring gear R2 and a short pinion P4 meshing with the second sun gear S2 in such a manner that the long pinion P3 meshes with the short pinion P4.

The first sun gear S1 of the planetary gear DP is held stationary with respect to the case 6. The first carrier CR1 is connected to the input shaft 7 so as to rotate together with the input shaft 7 (hereinafter, this type of rotation will be referred to as an "input rotation"). The first carrier CR1 is also connected to a fourth clutch C4. Further, the first ring gear R1 performs a decelerated rotation, which is the input rotation that has been decelerated, because of the first sun gear S1 that is held stationary and the first carrier CR1 performing the input rotation. Also, the first ring gear R1 is connected to a first clutch C1 and a third clutch C3.

The third sun gear S3 of the planetary gear unit PU is connected to a first brake B1 and is held stationary with respect to the case 6. Also, the third sun gear S3 is connected to the fourth clutch C4 and the third clutch C3 in such a manner that the input rotation of the first carrier CR1 can be input thereto via the fourth clutch C4 and the decelerated rotation of the first ring gear R1 can be input thereto via the third clutch C3. The second sun gear S2 is connected to the first clutch C1 in such a manner that the decelerated rotation of the first ring gear R1 can be input thereto.

Further, the second carrier CR2 is connected to the second clutch C2 to which the rotation of the input shaft 7 is input. The input rotation can be input to the second carrier CR2 via the second clutch C2. Also, the second carrier CR2 is connected to a one-way clutch F1 and a second brake B2 in such a manner that the rotation thereof in one direction is regulated with respect to the case (specifically, the transmission case) 6 via the one-way clutch F1. In addition, the second carrier CR2 is configured so that the rotation thereof is held stationary via the second brake B2. The second ring gear R2 is connected to a counter gear 8 that is rotatably supported by a center support member that is fixed to the case 6.

The counter gear 8 meshes with a large diameter gear 11 that is fixed to the countershaft 12 of the countershaft unit 4. The countershaft 12 meshes with a gear 14 of the differential unit 5 via a small diameter gear 12a that is provided on the outer circumferential surface of the countershaft 12. The gear 14 is fixed to a differential gear 13 and is connected to the left and right wheel shafts 15, 15 via the differential gear 13.

Based on the structure described above, an operation of the speed change mechanism 3 will be explained, with reference to FIGS. 1 and 2.

For example, when the vehicle is in the D (drive) range and is in the first forward speed ("1st"), as shown in FIG. 2, the first clutch C1 and the one-way clutch F1 are each engaged. Accordingly, the rotation of the first ring gear R1 performing the decelerated rotation because of the first sun gear S1 that is held stationary and the first carrier CR1 performing the input rotation is input to the second sun gear S2 via the first clutch C1. Also, the rotation of the second carrier CR2 is regulated so as to rotate only in one direction (i.e., in the normal direction of rotation). In other words, the second carrier CR2 is prevented from rotating in the reverse direction and is held stationary. As a result, the decelerated rotation that has been input to the second sun gear S2 is output to the second ring gear R2 via the second carrier CR2 that is held stationary, so that the normal direction rotation is output from the counter gear 8, as the first forward speed.

When the engine brake is used (i.e., during coasting), the second brake B2 is engaged so as to hold the second carrier CR2 stationary. Thus, the state in which the first forward speed is achieved is maintained by preventing the second carrier CR2 from rotating in the normal direction. Also, in the first forward speed, the one-way clutch F1 prevents the second carrier CR2 from rotating in the reverse direction and allows the second carrier CR2 to rotate in the normal direction. Thus, in the case where the vehicle is changed from a non-drive range to a drive range, it is possible to achieve the first forward speed smoothly because of the automatic engagement of the one-way clutch F1.

In the second forward speed ("2nd"), the first clutch C1 is engaged, and the first brake B1 is engaged. Accordingly, the rotation of the first ring gear R1 performing the decelerated rotation because of the first sun gear S1 that is held stationary and the first carrier CR1 performing the input rotation is input to the second sun gear S2 via the first clutch C1. Also, because the first brake B1 is engaged, the third sun gear S3 is held stationary. As a result, the rotation of the second carrier CR2 becomes a decelerated rotation which has a lower rotation speed than that of the second sun gear S2. Thus, the decelerated rotation that has been input to the second sun gear S2 is output to the second ring gear R2 via the second carrier CR2, so that a normal direction rotation is output from the counter gear 8, as the second forward speed.

In the third forward speed ("3rd"), the first clutch C1 and the third clutch C3 are each engaged. Accordingly, the rotation of the first ring gear R1 performing the decelerated rotation because of the first sun gear S1 that is held stationary and the first carrier CR1 performing the input rotation is input to the second sun gear S2 via the first clutch C1. Also, because the third clutch C3 is engaged, the decelerated rotation of the first ring gear R1 is input to the third sun gear S3. In other words, because the decelerated rotation of the first ring gear R1 is input to the third sun gear S3 and the second sun gear S2, the planetary gear unit PU becomes directly coupled to the decelerated rotation. As a result, the decelerated rotation is output to the second ring gear R2 as it is, and a normal direction rotation is output from the counter gear 8, as the third forward speed.

In the fourth forward speed ("4th"), the first clutch C1 and the fourth clutch C4 are each engaged. Accordingly, the rotation of the first ring gear R1 performing the decelerated rotation because of the first sun gear S1 that is held stationary and the first carrier CR1 performing the input rotation is input to the second sun gear S2 via the first clutch C1. Also, because the fourth clutch C4 is engaged, the input rotation of the first carrier CR1 is input to the third sun gear S3. As a result, the rotation of the second carrier CR2 becomes a decelerated rotation that has a higher rotation speed than that of the second sun gear S2. The decelerated rotation that has been input to the second sun gear S2 is output to the second ring gear R2 via the second carrier CR2. Thus, a normal direction rotation is output from the counter gear 8, as the fourth forward speed.

In the fifth forward speed ("5th"), the first clutch C1 and the second clutch C2 are each engaged. Accordingly, the rotation of the first ring gear R1 performing the decelerated rotation because of the first sun gear S1 that is held stationary and the first carrier CR1 performing the input rotation is input to the second sun gear S2 via the first clutch C1. Also, because the second clutch C2 is engaged, the input rotation is input to the second carrier CR2. As a result, because of the decelerated rotation that has been input to the second sun gear S2 and the input rotation that has been input to the second carrier CR2, a decelerated rotation that has a higher rotation speed than the one in the fourth forward speed is output to the second ring gear R2. Thus, a normal direction rotation is output from the counter gear 8, as the fifth forward speed.

In the sixth forward speed ("6th"), the second clutch C2 and the fourth clutch C4 are each engaged. Accordingly, because the fourth clutch C4 is engaged, the input rotation of the first carrier CR1 is input to the third sun gear S3. Also, because the second clutch C2 is engaged, the input rotation is input to the second carrier CR2. In other words, because the input rotation is input to the third sun gear S3 and the second carrier CR2, the planetary gear unit PU is directly connected to the input rotation, so that the input rotation is output to the second ring gear R2 as it is. Thus, a normal direction rotation is output from the counter gear 8, as the sixth forward speed.

In the seventh forward speed ("7th"), the second clutch C2 and the third clutch C3 are each engaged. Accordingly, the rotation of the first ring gear R1 performing the decelerated rotation because of the first sun gear S1 that is held stationary and the first carrier CR1 performing the input rotation is input to the third sun gear S3 via the third clutch C3. Also, because the second clutch C2 is engaged, the input rotation is input to the second carrier CR2. As a result, because of the decelerated rotation that has been input to the third sun gear S3 and the input rotation that has been input to the second carrier CR2, a decelerated rotation that has a slightly higher rotation speed than that of the input rotation is output to the second ring gear R2. Thus, a normal direction rotation is output from the counter gear 8, as the seventh forward speed.

In the eighth forward speed ("8th"), the second clutch C2 is engaged, and the first brake B1 is engaged. As a result, because the second clutch C2 is engaged, the input rotation is input to the second carrier CR2. Also, because the first brake B1 is engaged, the third sun gear S3 is held stationary. As a result, because of the third sun gear S3 that is held stationary, the input rotation of the second carrier CR2 is output to the second ring gear R2 as an accelerated rotation that has a higher rotation speed than that in the seventh forward speed. Thus, a normal direction rotation is output from the counter gear 8, as the eighth forward speed.

In the first reverse speed ("Rev 1"), the third clutch C3 is engaged, and the second brake B2 is engaged. As a result, the rotation of the first ring gear R1 performing the decelerated rotation because of the first sun gear S1 that is held stationary and the first carrier CR1 performing the input rotation is input to the third sun gear S3 via the third clutch C3. Also, because the second brake B2 is engaged, the second carrier CR2 is held stationary. As a result, the decelerated rotation that has been input to the third sun gear S3 is output to the second ring gear R2 via the second carrier CR2 that is held stationary. Thus, a reverse direction rotation is output from the counter gear 8, as the first reverse speed.

In the second reverse speed ("Rev 2"), the fourth clutch C4 is engaged, and the second brake B2 is engaged. As a result, because the fourth clutch C4 is engaged, the input rotation of the first carrier CR1 is input to the third sun gear S3. Also, because the second brake B2 is engaged, the second carrier CR2 is held stationary. As a result, the input rotation that has been input to the third sun gear S3 is output to the second ring gear R2 via the second carrier CR2 that is held stationary. Thus, a reverse direction rotation is output from the counter gear 8, as the second reverse speed.

For example, when the vehicle is in the P (parking) range or the N (neutral) range, the first clutch C1, the second clutch C2, the third clutch C3, and the fourth clutch C4 are disengaged. As a result, the connection between the first carrier CR1 and the third sun gear S3, as well as the connections between the first ring gear R1 and the third sun gear S3 and the second sun gear S2 are cut off. In other words, the connection between the planetary gear DP and the planetary gear unit PU is cut off. Also, the connection between the input shaft 7 and the second carrier CR2 is cut off. As a result, the power transmission between the input shaft 7 and the planetary gear unit PU is cut off. In other words, the power transmission between the input shaft 7 and the counter gear 8 is cut off.

Next, the structures of the third clutch C3 (i.e., one of the two clutches) and the fourth clutch C4 (i.e., the other one of the two clutches) according to the first embodiment of the present invention that are included in the automatic transmission 1 will be explained, with reference to FIG. 3. The fourth clutch C4 that is positioned on the radially inner side has a two-storied structure and is disposed in such a manner that the fourth clutch C4 is enclosed by the third clutch C3. In other words, the third clutch C3 is positioned on the radially outer side of the fourth clutch C4. Also, the third clutch C3 and the fourth clutch C4 overlap each other in the axial direction and are provided in mutually different positions in the radial direction.

The hydraulic servo 20 of the third clutch C3 includes a clutch drum 22, a piston member 24, a cancel plate 25, and a return spring 26. These constituent elements structure an operating oil chamber 27 and also structure the cancel oil chamber 28 on the back of the operating oil chamber 27. In the clutch drum 22, an inner drum 221 (i.e., an inner circumference side member) that includes a boss portion 22c and a piston supporting portion 22e and an outer drum (i.e., an outer circumference side member) 222 that includes a drum portion 22a and a bottom portion 22b are integrally formed by welding or the like. The outer circumferential side of the drum portion 22a extends up to the rear side of the first clutch C1 (not shown in the drawing). The boss portion 22c is rotatably supported by a stator shaft (i.e., a fixing member) 6a via a bush 55. The boss portion 22c and the drum portion 22a are joined together by the bottom portion 22b. Note that the converter housing and the transmission case are integrally connected and designated as the case 6. In addition, the case and the members integrated with the case are fixing members, which include the case, an oil pump cover and its case, the stator shaft 6a and the like. Therefore, the first sun gear S1 and the boss portion 22c of the clutch drum 22 may be fixed and rotatably supported by any fixing members such as the case or the fixing members integrated with the case as well as the stator shaft 6a, respectively.

In the middle part of the bottom portion 22b of the clutch drum 22, a flange portion 22d is formed on the outer circumference of the piston supporting portion 22e that extends from the boss portion 22c toward the radially outer side. The flange portion 22d extends a considerably shorter distance than the drum portion 22a and the boss portion 22c and in the same direction as the drum portion 22a and the boss portion 22c. Also, the outer circumferential surface of the flange portion 22d is joined with the piston member 24 in an oil-tight manner via an O ring 31. The inner circumferential surface of the flange portion 22d forms a spline engagement portion 54 with a clutch drum 42 of the fourth clutch C4, which is explained later.

The piston member 24 fits with the flange portion 22d in such a manner that the piston member 24 is movable in the axial direction. The outer circumferential surface of the piston member 24 is joined with the inner circumferential surface of the clutch drum 22 in an oil-tight manner via a sealing member 56. The operating oil chamber 27 is structured by the piston member 24 and the inner circumferential surface of the clutch drum 22 forming a cylinder. Also, the piston member 24 has an extended portion 24a that is provided so as to extend toward the rear side. The third clutch C3 is engaged and disengaged by the action of the extended portion 24a to press the friction plates 21.

The position, in terms of the axial direction, of the clutch drum 42 of the fourth clutch C4 is regulated by a snap ring 50 at the boss portion 22c of the third clutch C3. Also, the clutch drum 42 is provided so as to be in an oil-tight manner via an O ring 57. Also, the clutch drum 42 has a step portion 53 having a step-like shape in the cross-section on the rear side of the spline engagement portion 54 at which the clutch drum 42 is engaged with the flange portion 22d of the third clutch C3.

The cancel plate 25 of the third clutch C3 abuts against the step portion 53 that is provided on the clutch drum 42 of the fourth clutch C4 so as to be restricted to the rearward movement in the axial direction. The outer circumferential portion of the cancel plate 25 is provided so as to be oil tight with the piston member 24 via a sealing member 58. Also, the inner circumferential portion of the cancel plate 25 is fitted, in an oil-tight manner, to the clutch drum 42 of the fourth clutch C4 via a sealing member 85. The cancel oil chamber 28 that generates a hydraulic pressure that equilibrates with the centrifugal hydraulic pressure caused inside the operating oil chamber 27 in the third clutch C3 is structured by the outer circumferential surface of the cancel plate 25 and the inner circumferential surface of the piston member 24. Also, the return spring 26 is provided between the cancel plate 25 and the piston member 24 so as to bias the piston member 24 toward the front side at all times. The return spring 26 is configured with a spring that has a stronger biasing force than a return spring 46 provided in the cancel oil chamber 48 in the fourth clutch C4, which is explained later.

To the operating oil chamber 27 in the third clutch C3, oil is supplied from oil holes b via a predetermined gap B that is formed between the piston supporting portion 22e of the inner drum 221 and the bottom portion 22b of the outer drum 222. Because the gap B is formed so as to extend in planar manner throughout the entire circumference, the gap B has a larger oil-passage cross-section area than oil passage bores, although the gap B occupies a space that is short (i.e., narrow) in the axial direction.

To the cancel oil chamber 28 in the third clutch C3, lubricant oil is supplied from oil holes a via a gap A that is formed between the clutch drum 42 of the fourth clutch C4 and the back face of the piston supporting portion 22e of the inner drum 221 of the third clutch C3. Because the gap A is formed so as to extend in planar manner throughout the entire circumference, although the gap A is configured so as to keep the distance between the clutch drums 22 and 42 in the axial direction short (i.e., to make the dimension in the axial direction smaller), the gap A has a larger oil-passage cross-section area than other structures that use oil passage bores. The spline engagement portion 54 that is provided between the clutch drum 42 of the fourth clutch C4 and the flange portion 22d of the third clutch C3 has an interrupted toothing configuration so that the flow of the oil in the oil passage is not inhibited.

The hydraulic servo 40 of the fourth clutch C4 includes the clutch drum 42, a piston member 44, a cancel plate 45, and the return spring 46. These constituent elements structure the operating oil chamber 47 and also structure the cancel oil chamber 48 on the back of the operating oil chamber 47.

The piston member 44 is provided so as to be oil tight with the boss portion 22c of the clutch drum 22 of the third clutch C3 via a sealing member 59. Also, the piston member 44 is provided so as to be movable in the axial direction. The piston member 44 also has an extended portion 44a that presses the friction plates 41. The outer circumferential surface of the extended portion 44a is fitted, in an oil-tight manner, with the inner circumferential surface of the clutch drum 42 via an O ring 51.

The operating oil chamber 47 in the fourth clutch C4 is structured by the outer circumferential surface of the piston member 44 and the inner circumferential surface of the clutch drum 42 forming a cylinder. Oil is supplied to the operating oil chamber 47 through oil holes c.

The position, in terms of the axial direction, of the cancel plate 45 of the fourth clutch C4 is regulated by a stepped portion 22f of the boss portion 22c in the clutch drum 22 of the third clutch C3 and a snap ring 30. The cancel plate 45 is fitted, in an oil-tight manner, with the inner circumferential surface of the piston member 44 via a sealing member 60.

The cancel oil chamber 48 that generates a hydraulic pressure that equilibrates with the centrifugal hydraulic pressure caused inside the operating oil chamber 47 of the fourth clutch C4 is structured by the inner side face of the cancel plate 45 and the back face of the piston member 44. The return spring 46 is provided between the piston member 44 and the cancel plate 45 so that the piston member 44 is biased toward the front side at all times. Also, lubricant oil is supplied to the cancel oil chamber 48 through oil holes "d".

Next, a second embodiment of the present invention that is obtained by further enlarging the oil-passage oil cross-section areas to the operating oil chamber 27 and the cancel oil chamber 28 in the third clutch C3 will be explained with reference to FIGS. 4A, 4B, 4C, and 5, while a focus is placed on the structures that are different from those of the first embodiment.

As explained above, to the operating oil chamber 27 in the third clutch C3, the oil is supplied from the oil holes b via the gap B. To the cancel oil chamber 28, the lubricant oil is supplied from the oil holes a via the gap A. The gap B is a gap that extends in a planar manner between an outer face 71, which is the surface of the inner drum 221 that opposes the outer drum 222, and an inner wall 73, which is the inner surface of the outer drum 222. The gap A is a gap that extends in a planar manner between the back face 70, which is positioned on the back of the outer face 71 of the inner drum 221, and the outer side face of the clutch drum 42 of the fourth clutch C4. A radially inner side portion of the clutch drum 42 is structured so as to be at an angle rearward, toward the radially inner side. In addition, the inner drum 221 in the clutch drum 22 is raised substantially vertically, except for projection portions 72, which are explained later. As a result, the gap A has space portions A' of which the center side part (i.e., the part in the input shaft direction 7) is wide in the axial direction and of which the radially outer side part is narrow.

The back face 70 of the inner drum 221 has rib-like projection portions (i.e., projections) 72 formed thereon in four positions on the circumference, the projection portions 72 being configured so as to project toward the fourth clutch C4. The oil holes b used for supplying the oil to the operating oil chamber 27 are formed within the projection portions 72. Each of the oil holes b is configured so as to go through the inner drum 221 and form an opening portion b2 in the outer face 71. According to the first embodiment described above, as shown in the lower half of FIG. 3, the inner drum 221 is structured so as to be thick. However, according to the second embodiment, as shown in FIG. 4B, the inner drum 221 is structured so as to be thin in its entirety (except for the projection portions 72), so that the space portions A' are formed between the inner drum 221 and the clutch drum 42 of the fourth clutch C4. The number of projection portions 72 described above does not have to be four. It is acceptable to provide three projection portions 72, five projection portions 72, or any other number of projection portions 72.

As shown in FIG. 4A, in the cylinder-shaped boss portion 22c formed on the radially inner side of the inner drum 221, the oil holes b, the oil holes a used for supplying the lubricant oil to the cancel oil chamber 28, and discharge bores e used for discharging the lubricant oil are provided at different intervals in the circumferential direction. (In FIG. 4B, the bores a and e are both indicated for the convenience of preparing the drawings; however, in actuality, these portions have partially different cross-sectional views.) The oil holes b are provided in four positions on the circumference of the boss portion 22c, like the projection portions 72. Between every two of the oil holes b, one oil hole a is provided, while being interposed between two discharge bores e. Also, on the radially inner side of the oil holes a and b used for supplying the oils, oil reservoirs a1 and b1 are respectively provided so as to extend in the circumferential direction.

In the inner wall 73 of the outer drum 222 that opposes the outer face 71 of the inner drum 221, grooves 74 are provided in such positions that oppose the openings b2 of the oil holes b formed on the outer face 71. Each of the grooves 74 radially extends toward the radially outer side, along the plane of the inner wall 73. Also, each of the grooves 74 is formed as a recessed portion having an oblong rectangular shape throughout the length of the gap B up to the operating oil chamber 27. Thus, the grooves 74 keep the oil-passage cross-section area of the gap B large, without having the gap B expand in the axial direction. In addition, the grooves 74 allow the oil supplied from the openings b2 of the oil holes b to quickly fill the space in the circumferential direction.

Of the back face 70 of the inner drum 221, the surface on which the projection portions 72 are not provided (i.e., the surface where the oil holes a and the discharge holes e are positioned at equal intervals) is configured so as to have a concave shape that recesses toward the outer drum 222 side (i.e., in the Fr direction). Together with the clutch drum 42 of the fourth clutch C4, the back face 70 structures the gap A used for supplying the lubricant oil to the cancel oil chamber 28. Thus, by configuring the back face 70 so as to have the concave shape that conform to the oil holes a and the discharge bores e, it is possible to make the oil-passage cross-section area of the gap A large, without having the gap A expand in the axial direction.

As for the clutch drum 22 of the third clutch C3, the projection portions 72 on the inner drum 221 and the grooves 74 in the outer drum 222 are provided in corresponding positions at equal intervals on the circumference. The concave-shaped portion of the back face 70 of the inner drum 221 and the part of the inner wall 73 other than the grooves 74 are provided in corresponding positions at equal intervals on the circumference. As a result, the overall structure is thin and has a high level of rigidity.

It is acceptable to have another arrangement in which, in the fourth clutch C4, the oil holes c used for supplying the oil to the operating oil chamber 47 and the oil holes d used for supplying the lubricant oil to the cancel oil chamber 48 are provided at one of equal intervals and different intervals in the circumferential direction so that, like in the third clutch C3, grooves are provided radially toward the radially outer side on the inner circumferential surface of the clutch drum 42 that structures the operating oil chamber 47.

Next, operations of the third clutch C3 and the fourth clutch C4 will be explained.

The third clutch C3 is engaged and disengaged by having the piston member 24 move in the axial direction with the hydraulic pressure caused in the operating oil chamber 27 so as to press the friction plates 21. To the operating oil chamber 27, the operating oil based on the hydraulic pressure caused by an oil pump (not shown in the drawings) is supplied from the oil holes b provided in the clutch drum 22 through the gap B that is formed in a planar manner throughout the entire circumference and the grooves 74.

Also, because the centrifugal hydraulic pressure acts in the operating oil chamber 27, to the cancel oil chamber 28 that opposes the operating oil chamber 27 while the piston member 24 is interposed therebetween, the lubricant oil is supplied from the oil holes a via the gap A that is formed in a planar manner throughout the entire circumference. Thus, the centrifugal hydraulic pressure is caused in the cancel oil chamber 28 so that the centrifugal hydraulic pressure equilibrates with the centrifugal hydraulic pressure caused in the operating oil chamber 27.

Similarly, in the fourth clutch C4, to the operating oil chamber 47, the operating oil based on an oil pump (not shown in the drawing) is supplied from the oil holes c. The clutch C4 is engaged and disengaged by having the piston member 44 move in the axial direction so as to press the friction plates 41. Also, to the cancel oil chamber 48, the lubricant oil is supplied from the oil holes d. Thus, the centrifugal hydraulic pressure is caused in the cancel oil chamber 48 so that the centrifugal hydraulic pressure equilibrates with the centrifugal hydraulic pressure caused in the operating oil chamber 47.

Accordingly, when the third clutch C3 is disengaged, the hydraulic oil in the operating oil chamber 27 is drained via the gap B, the grooves 74, and the oil holes b. However, because the clutch drum 22 is rotating, a centrifugal hydraulic pressure is being caused in the operating oil chamber 27. In this situation, the biasing force of the return spring 26 and the centrifugal hydraulic pressure acting on the oil in the cancel oil chamber 48 are acting on the back face of the piston member 24. As a result, the piston member 24 is rapidly moved in the retracting direction against the centrifugal hydraulic pressure within the operating oil chamber 27. Consequently, the volume of the cancel oil chamber 28 increases; however, because the oil is quickly supplemented through the gap A that is formed between the clutch drum 22 and the clutch drum 42, no delay is caused in the operation of the third clutch C3.

As explained above, in the automatic transmission 1 according to the present invention, the third clutch C3 is positioned on the radially outer side of the fourth clutch C4, so that the third clutch C3 and the fourth clutch C4 are provided in the mutually different positions in the radial direction, while overlapping each other in the axial direction. Thus, it is possible to structure the clutch unit and the automatic transmission that are compact in the axial direction. In addition, because the oil holes "b" are provided on the radially inner side of the clutch drum 22 of the third clutch C3, and also the gap B that extends in a planar manner is formed on the radially outer side of the clutch drum 22 between the clutch drum 22 and the piston supporting portion 22e, it is possible to quickly supply and discharge the hydraulic pressure to and from the operating oil chamber 27 of the third clutch C3. Further, because the grooves 74 are formed with the gap B, it is possible to supply and discharge the hydraulic pressure even more quickly to and from the operating oil chamber 27 of the third clutch C3.

Furthermore, the gap A that is formed between the clutch drum 22 of the third clutch C3 and the clutch drum 42 of the fourth clutch C4 is configured as the oil supplying passage to the cancel oil chamber 28 in the third clutch C3. In addition, the clutch drum 22 is structured so as to be thin by using the gap B as the oil passage to the operating oil chamber 27. As a result, it is possible to make the dimension in the axial direction smaller. In this situation, even if the grooves 74 are provided in the third clutch C3, and also the back face 70 of the inner drum 221 is formed so as to have a concave shape, because the grooves 74 and the concave-shaped portion of the back face 70 are provided in the positions at different intervals in the circumferential direction, the clutch drum 22 of the third clutch C3 maintains, in its entirety, a high level of rigidity.

According to an exemplary aspect of the present invention, by providing the two clutches in the mutually different positions in the radial direction, while having them overlap each other in the axial direction, it is possible to make the clutch unit as well as the automatic transmission compact in the axial direction. In addition, the operating oil chamber and the cancel oil chamber of the one of the two clutches positioned on the radially outer side are respectively positioned on the radially outer side of the operating oil chamber and the cancel oil chamber of the other of the two clutches positioned on the radially inner side. Also, to and from the operating oil chamber of the one of the two clutches, the hydraulic pressure is supplied and discharged via the oil passage that is formed between the inner circumference side member and the outer circumference side member of the clutch drum in the one of the two clutches. With these arrangements, by using the oil passage having the simple structure, it is possible to quickly supply the hydraulic pressure to the operating oil chamber of the one of the two clutches. Further, by having the outer circumference side member and the inner circumference side member integrally structured, it is possible to make the clutch even shorter in the axial direction.

According to an exemplary aspect of the present invention, the clutch drum of the one of the two clutches is provided so as to enclose the clutch drum of the other of the two clutches. In addition, the oil passage is formed between the bottom portion of the outer circumference side member and the piston supporting portion of the inner circumference side member. With these arrangements, it is possible to make the dimension of the automatic transmission in the axial direction compact.

According to an exemplary aspect of the present invention, in the clutch drum of the one of the two clutches, the groove is formed in such an inner wall of the outer circumference side member that opposes the inner circumference side member. In addition, the groove is used as the oil passage for supplying and discharging the hydraulic pressure to and from the operating oil chamber of the one of the two clutches. With these arrangements, by using the simple structure, it is possible to supply and discharge the hydraulic pressure to and from the operating oil chamber of the one of the two clutches positioned on the radially outer side. Further, the clutch drum portion that, in the radial direction, overlaps the operating oil chamber of the other of the two clutches is structured so as to be thin. In addition, there is no need to form an oil hole connected to the operating oil chamber of the one of the two clutches. With these arrangements, it is also possible to make the dimension in the axial direction smaller. In addition, it is possible to enlarge the oil-passage cross-section area by having the groove formed in the inner wall of the outer circumference side member that opposes the inner circumference side member. Consequently, it is possible to even more quickly supply and discharge the hydraulic pressure to and from the operating oil chamber.

According to an exemplary aspect of the present invention, the gap is formed between the outer circumference side member and the inner circumference side member of the one of the two clutches. In addition, the oil passage used for supplying and discharging the hydraulic pressure to and from the operating oil chamber of the one of the two clutches is configured with the gap. With these arrangements, it is possible to quickly supply and discharge the hydraulic pressure to and from the operating oil chamber via the gap that extends in a planner manner throughout the whole length in the circumferential direction. In addition, by providing both the oil passage configured with the groove and the oil passage configured with the gap, it is possible to quickly and accurately supply and discharge the hydraulic pressure to and from the operating oil chamber of the one of the two clutches, at a sufficient flow rate and with a small oil passage resistance.

According to an exemplary aspect of the present invention, in the boss portion of the inner circumference side member of the clutch drum of the one of the two clutches, the first oil hole and the second oil hole are provided at different intervals in the circumferential direction, the first oil hole being used for supplying the oil to the operating oil chamber of the one of the two clutches, and the second oil hole being used for supplying the oil to the cancel oil chamber of the one of the two clutches. Thus, it is possible to have the oil holes overlap each other in the axial direction. Consequently, it is possible to accurately supply the hydraulic pressure or the oil, even if the clutch is structured so as to be shorter in the axial direction.

According to an exemplary aspect of the present invention, of the inner circumference side member and the outer circumference side member in the clutch drum of the one of the two clutches, the plurality of rib-like projections are formed on the inner circumference side member, the plurality of rib-like projections being configured so as to project toward the clutch drum of the other of the two clutches. The projections have the first oil hole built therein, the first oil hole being used for the supply to the operating oil chamber of the one of the two clutches. In addition, the opening of the first oil hole and the groove formed in the inner wall of the outer circumference side member are positioned so as to be in alignment. With these arrangements, it is possible to enlarge the oil-passage cross-section area. Consequently, it is possible to smoothly supply and discharge the hydraulic pressure to and from the operating oil chamber of the one of the two clutches.

Further, the space portions of the inner circumference side member and the groove formed in the outer circumference side member are provided at different intervals in the circumferential direction. In addition, the inner circumference side member has the rib-like projections in such positions that oppose the groove. With these arrangements, even if the clutch drum of the one of the two clutches is structured so as to be thin, the clutch drum is able to maintain, in its entirety, a high level of rigidity.

According to an exemplary aspect of the present invention, the operating oil chamber of the other of the two clutches is structured by fitting the piston to the clutch drum of the other of the two clutches and the boss portion of the inner circumference side member of the one of the two clutches. In addition, the oil holes used for supplying and discharging the hydraulic pressure to and from the operating oil chamber of the other of the two clutches are respectively formed in the plurality of positions in the boss portion in the inner circumferential direction. With these arrangements, when the other of the two clutches starts being operated, it is possible to easily have the entire hydraulic servo filled with the hydraulic pressure.

According to an exemplary aspect of the present invention, it is possible to configure an automatic transmission that achieves eight forward speeds and at least one reverse speed so as to be compact, especially in the axial direction.

What is claimed is:

1. An automatic transmission, comprising:
   two clutches that are provided in mutually different positions in a radial direction while overlapping each other in an axial direction, the two clutches each including:
      a clutch drum;
      a piston that structures an operating oil chamber while using a part of the clutch drum as a cylinder;
      a plurality of friction plates that engage the clutch drum; and
      a cancel oil chamber that is disposed on a back face side of the piston and that cancels a centrifugal hydraulic pressure acting on the operating oil chamber, wherein:
   the operating oil chamber and the cancel oil chamber of one clutch of the two clutches positioned on a radially outer side are respectively positioned on a radially outer side of the operating oil chamber and the cancel oil chamber of the other clutch of the two clutches positioned on a radially inner side,
   the clutch drum of the one clutch of the two clutches includes an inner circumference side member and an outer circumference side member that are integrally structured, the inner circumference side member including a boss portion and a piston supporting portion, and the outer circumference side member including a drum portion and a bottom portion, and
   an oil passage through which a hydraulic pressure is supplied and discharged to and from the operating oil chamber of the one clutch of the two clutches is formed between the inner circumference side member and the outer circumference side member.

2. The automatic transmission according to claim 1, wherein:
   the clutch drum of the one clutch of the two clutches is provided so as to enclose the clutch drum of the other clutch of the two clutches, and
   the oil passage is formed between the bottom portion of the outer circumference side member and the piston supporting portion of the inner circumference side member.

3. The automatic transmission according to claim 1, wherein:
   a groove is formed in an inner wall of the outer circumference side member that opposes the inner circumference side member, and the oil passage is configured with the groove.

4. The automatic transmission according to claim 1, wherein:
   the inner circumference side member and the outer circumference side member have a gap therebetween, and
   the oil passage is configured with the gap.

5. The automatic transmission according to claim 4, wherein:
   in the boss portion of the inner circumference side member, a first oil hole and a second oil hole are provided at different intervals in a circumferential direction, the first oil hole being connected to the oil passage in such a manner that communication is allowed therebetween, and the second oil hole being used for supplying oil to the cancel oil chamber of the one clutch of the two clutches.

6. The automatic transmission according to claim 5, wherein:
   the inner circumference side member has a plurality of rib-like projections formed thereon, the plurality of rib-like projections being configured so as to project toward the clutch drum of the other clutch of the two clutches,
   the projections have the first oil hole built therein, and
   an opening of the first oil hole and the groove are positioned so as to be in alignment.

7. The automatic transmission according to claim 1, wherein:
   the operating oil chamber of the other clutch of the two clutches is structured by fitting the piston of the other clutch of the two clutches to the clutch drum of the other clutch of the two clutches and the boss portion of the inner circumference side member, and
   oil holes used for supplying and discharging a hydraulic pressure to and from the operating oil chamber of the other clutch of the two clutches are respectively formed in a plurality of positions in the boss portion in an inner circumferential direction.

8. The automatic transmission according to claim 1, comprising:
- an input shaft to which an input rotation from a driving power source is input;
- a deceleration planetary gear that includes:
  - a first sun gear that is held stationary by a fixing member integrally structured with a case,
  - a first carrier that is connected to the input shaft, and
  - a first ring gear that outputs a decelerated rotation because of the first sun gear that is held stationary and the first carrier to which the input rotation is input; and
- a planetary gear set that includes:
  - a second sun gear to which the decelerated rotation of the first ring gear is input because of an engagement of the a first clutch,
  - a third sun gear to which the decelerated rotation of the first ring gear is input because of an engagement of a third clutch, wherein a rotation of the input shaft is input to the third sun gear via the first carrier because of an engagement of a fourth clutch, and the third sun gear is held stationary by an engagement of a first brake,
  - a second carrier that includes a long pinion that meshes with the third sun gear and a short pinion that meshes with the long pinion and the second sun gear, wherein the second carrier is held stationary by an engagement of a second brake, and the rotation of the input shaft is input to the second carrier because of an engagement of a second clutch, and
  - a second ring gear that meshes with the long pinion and is rotatably connected to an output member, wherein:
- the one clutch of the two clutches is the third clutch,
- the other clutch of the two clutches is the fourth clutch,
- a first forward speed is achieved by engaging the first clutch and engaging the second brake,
- a second forward speed is achieved by engaging the first clutch and engaging the first brake,
- a third forward speed is achieved by engaging the first clutch and the third clutch,
- a fourth forward speed is achieved by engaging the first clutch and the fourth clutch,
- a fifth forward speed is achieved by engaging the first clutch and the second clutch,
- a sixth forward speed is achieved by engaging the second clutch and the fourth clutch,
- a seventh forward speed is achieved by engaging the second clutch and the third clutch,
- an eighth forward speed is achieved by engaging the second clutch and engaging the first brake, and
- a reverse speed is achieved by engaging either the third clutch or the fourth clutch and engaging the second brake.

9. The automatic transmission according to claim 1, wherein oil is supplied to the cancel oil chamber of the one clutch of the two clutches through a gap between the clutch drum of the other clutch of the two clutches and the clutch drum of the one clutch of the two clutches.

10. The automatic transmission according to claim 9, wherein:
- the inner circumference side member has a plurality of rib-like projections formed thereon, the plurality of rib-like projections being configured so as to project into the gap toward the clutch drum of the other clutch of the two clutches,
- oil passages are formed within the projections in order to supply and drain off hydraulic pressure for the operating oil chamber of the one clutch of the two clutches, and
- a portion of the gap where the projections are not present forms a space portion between the clutch drum of the other clutch of the two clutches and the clutch drum of the one clutch of the two clutches.

11. The automatic transmission according to claim 10, wherein oil holes that supply oil to and drain oil from the cancel oil chamber of the one clutch of the two clutches are disposed in a line in the space portion.

* * * * *